United States Patent [19]

Morimoto et al.

[11] Patent Number: 4,633,435
[45] Date of Patent: Dec. 30, 1986

[54] ELECTRONIC LANGUAGE TRANSLATOR CAPABLE OF MODIFYING DEFINITE ARTICLES OR PREPOSITIONS TO CORRESPOND TO MODIFIED RELATED WORDS

[75] Inventors: Masafumi Morimoto, Yamatokoriyama; Michihiro Noda, Nara; Shigenobu Yanagiuchi; Yasuko Yanagiuchi, both of Tenri, all of Japan

[73] Assignee: Sharp Kabushiki Kaisha, Osaka, Japan

[21] Appl. No.: 757,206

[22] Filed: Jul. 22, 1985

Related U.S. Application Data

[63] Continuation of Ser. No. 314,033, Oct. 22, 1981, abandoned.

[30] Foreign Application Priority Data

Oct. 28, 1980 [JP] Japan .................................. 55-151884

[51] Int. Cl.[4] .............................................. G06F 15/38
[52] U.S. Cl. ..................................... 364/900; 364/419
[58] Field of Search ... 364/200 MS File, 900 MS File, 364/419

[56] References Cited

U.S. PATENT DOCUMENTS

| | | |
|---|---|---|
| 4,041,467 | 8/1977 | Cota et al. ............................ 364/900 |
| 4,383,306 | 5/1983 | Morimoto et al. .................... 364/900 |
| 4,393,460 | 7/1983 | Masuzawa et al. ................... 364/900 |
| 4,393,462 | 7/1983 | Tanimoto et al. .................... 364/900 |
| 4,417,319 | 11/1983 | Morimoto et al. .................... 364/900 |
| 4,443,856 | 4/1984 | Hashimoto et al. ............... 364/513.5 |

FOREIGN PATENT DOCUMENTS

| | | |
|---|---|---|
| 3037480 | 4/1981 | Fed. Rep. of Germany ...... 364/419 |
| 2446517 | 8/1980 | France ................................. 364/900 |
| 55-103675 | 8/1980 | Japan ................................... 364/419 |
| 2014765 | 8/1979 | United Kingdom ............ 179/1.5 M |
| 2074354 | 8/1981 | United Kingdom ................ 364/419 |
| 2076194 | 11/1981 | United Kingdom ................ 364/419 |
| 2078412 | 1/1982 | United Kingdom ................ 364/419 |

OTHER PUBLICATIONS

M. Ishida et al, *Language Learning With A Microcomputer,* Nat'l. Tech. Report (Japan), vol. 26, No. 1, (Feb. 1980), pp. 146-154.

S. Kamuro et al, High Density CMOS Read-Only Memories For A Handheld Electronics Language Translator, IEEE Trans. Consumer Electronics (USA), vol. CE-27, No. 4, (Nov. 1981), pp. 605-609.

B. Staples, Craig and Nixdorf Language Translators, Creative Computing (Dec., 1979), pp. 20, 22.

S. Takahasi et al, *English-Japanese Machine Translation,* Proceedings of the Intl. Conf. on Information Processing (Paris, Jun. 1959), pp. 194-199.

English Translation of Reference L (above).

*Primary Examiner*—Archie E. Williams
*Attorney, Agent, or Firm*—Birch, Stewart, Kolasch and Birch

[57] ABSTRACT

An electronic translator is featured in which sentences as stored are modified by replacing one or more words in one of the original sentences with one or more new words and by changing automatically one or more additional words in the original sentence, depending on the nature of the one or more new words entered in the sentence. For example, the one or more additional words may be definite articles or prepositions.

5 Claims, 12 Drawing Figures

ELECTRONIC LANGUAGE TRANSLATOR CAPABLE OF MODIFYING DEFINITE ARTICLES OR PREPOSITIONS TO CORRESPOND TO MODIFIED RELATED WORDS

This application is a continuation of application Ser. No. 314,033 filed on Oct. 22, 1981, now abandoned.

BACKGROUND OF THE INVENTION

The present invention relates in general to a word information storage and retrieval device and, more particularly, to an electronic translator for providing efficient and rapid retrieval of any desired word or words stored therein.

Recently, a new type of electronic device called an electronic language translator has been available on the market. The electronic language translator differs from conventional types of electronic devices in that the former is of a unique structure which provides for efficient and rapid retrieval of word information stored in memory.

Such an electronic language translator can operate to form new sentences based on old sentences by changing some words in the old sentences to new words. When some of the words in a sentence are changed, in some cases, additional words such as the definite articles or prepositions must also be changed accordingly depending on each of the words that is changed. The conventional electronic translators cannot change definite articles or prepositions to correspond to the changeable words that are related to the definite articles or prepositions.

SUMMARY OF THE INVENTION

Accordingly, it is an object of the present invention to provide an improved electronic language translator for automatically modifying additional words such as definite articles or prepositions to correspond to other related words that have been changed.

It is another object of the present invention to provide an improved electronic language translator for storing discrimination codes specifying additional words such as definite articles or prepositions, so that the definite articles or the prepositions are selectively changed to correspond to changed words to which the definite articles or the prepositions are related by referring to the type of discrimination codes.

Briefly described, in accordance with the present invention, an electronic language translator is featured in which stored sentences can be modified by replacing one or more words in one of the stored sentences with one or more new words and by changing automatically one or more additional words in the modified sentence, depending on the one or more new words. For example, the one or more additional words changed may be definite articles or prepositions.

BRIEF DESCRIPTION OF THE DRAWING

The present invention will become more fully understood from the detailed description given hereinbelow and the accompanying drawing which is given by way of illustration only, and thus are not limitative of the present invention and wherein:

FIGS. 6(1) through 6(4) show details of of word data regions and sentence data regions contained within the ROM of FIG. 4;

DESCRIPTION OF THE INVENTION

First of all, any language can be applied to an electronic translator of the present invention. An input word is spelled in a specific language to obtain an equivalent word, or a translated word spelled in a different language corresponding thereto. The languages can be selected freely.

Figure 1:
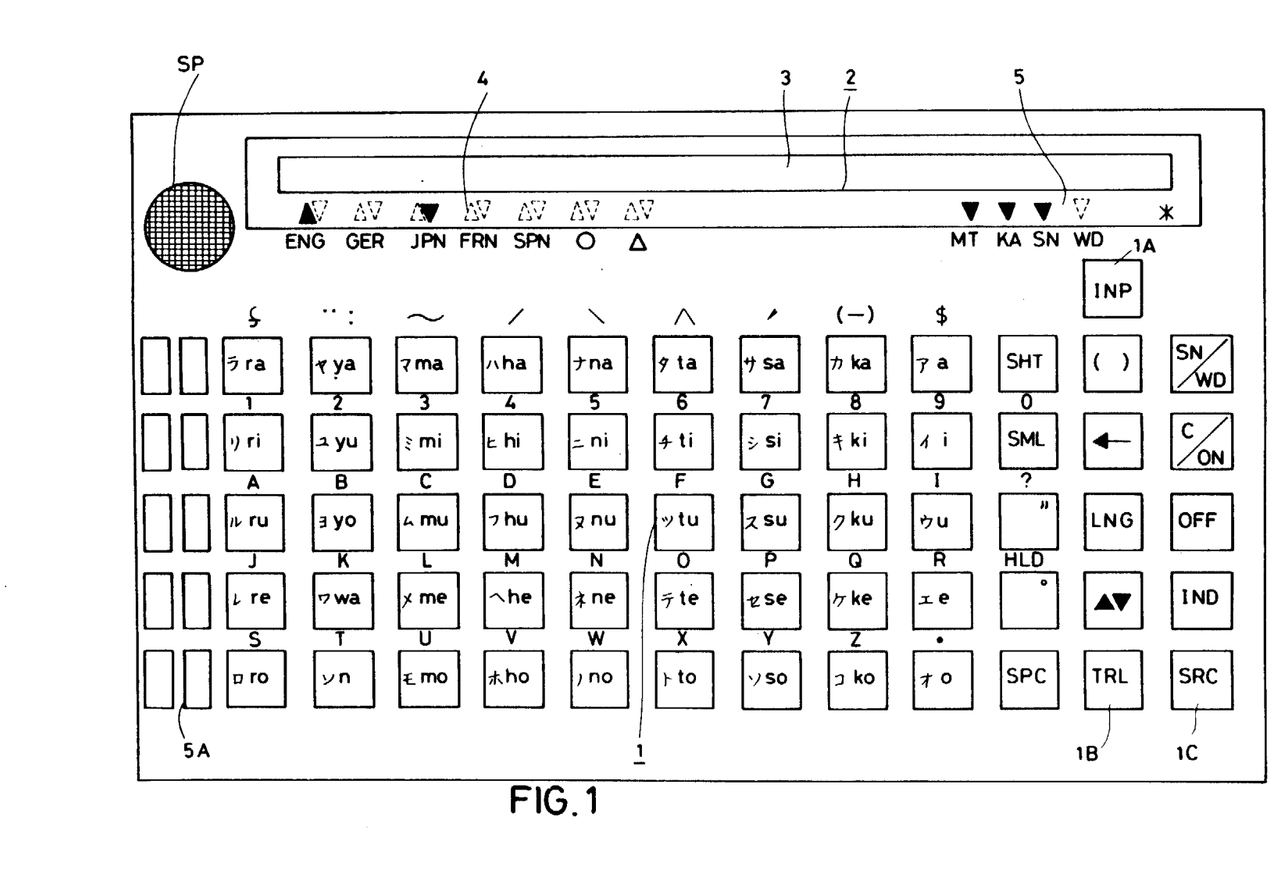
FIG. 1 shows a plan view of an electronic language translator according to the present invention.

Referring now to FIG. 1, there is illustrated an electronic language translator according to the present invention. The translator comprises a keyboard 1 containing a Japanese syllabary keyboard, an alphabetical keyboard, a symbol keyboard, and a functional keyboard, an indicator 2 including a character indicator 3, a language indicator 4 and a symbol indicator 5.

The character indicator 3 shows characters processed by this translator. The language indicator 4 shows symbols used for representing the mother language and the foreign language then being processed by the translator. The symbol indicator 5 shows symbols used for indicating operating conditions in this translator.

Figure 2:
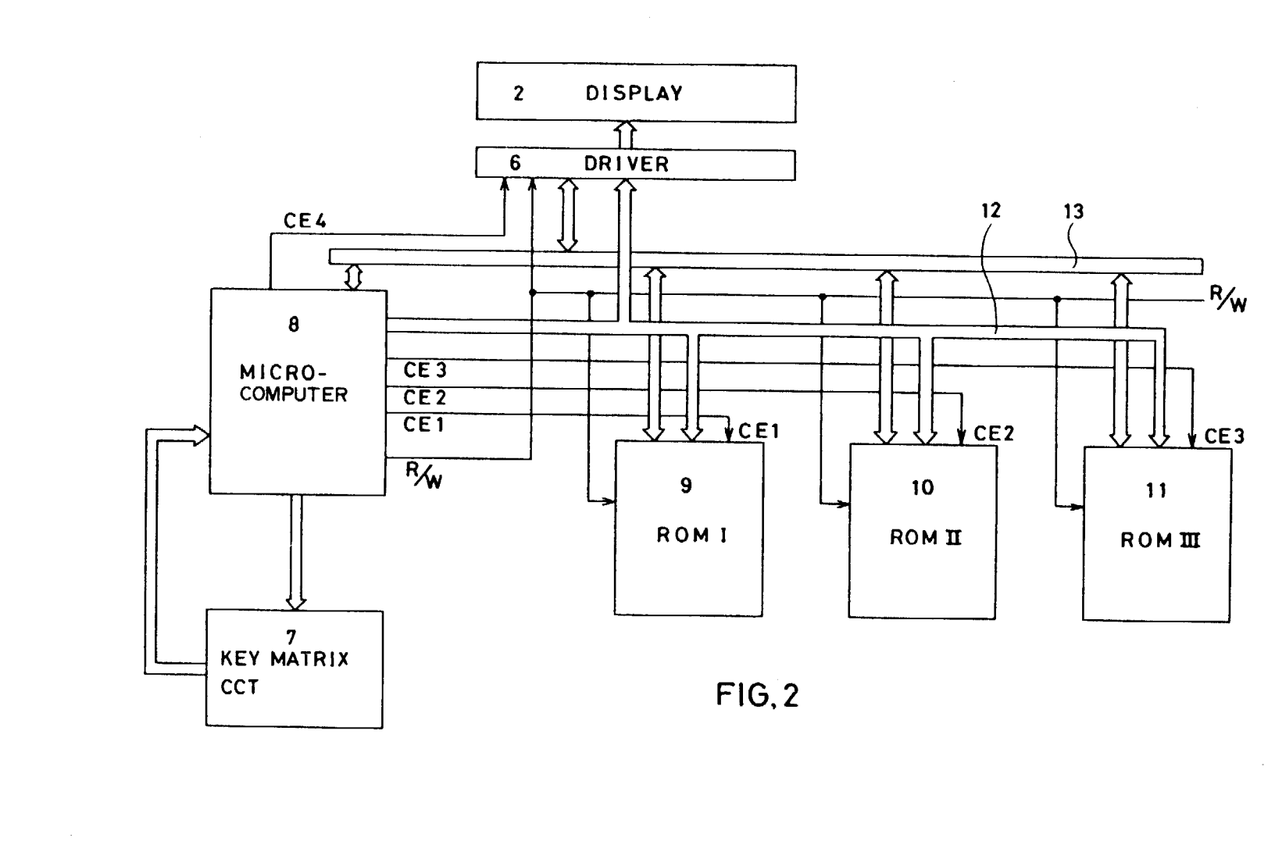
FIGS. 2 and 3 show collectively a block diagram of a control circuit implemented within the translator as shown in FIG. 1.

FIG. 2 shows a block diagram of a control circuit implemented in the translator according to the present invention. The circuit comprises the indicator 2, a driver 6, a key matrix circuit 7, a microcomputer 8, ROM I 9, ROM II 10, and ROM III 11. The circuit 7 functions with the keyboard 1 of FIG. 1. The circuit 7 is connected to terminals of the microcomputer 8 for developing key strobe signals and key input signals. Each of the ROM's 9 to 11 contains words and/or sentences used by the translator.

According to a preferred embodiment of the present invention, each one of the ROM's 9 to 11 corresponds to one language. For example, the ROM I 9 stores a plurality of English words, the ROM II 10 stores a number of Japanese words and the ROM III 11 stores a number of German words. Preferably, the ROM I 9 is built into the translator so that it can not be removed from the translator for exchange purposes. However, it is preferable that each of the ROM II 10 and ROM III 11 can be removed from the translator and replaced by another type of ROM as module ① or ② to permit the user to translate between the mother language (here English) and additional foreign languages such as French or Spanish (see FIG. 1).

Each of the ROM's 9 to 11 is connected to the microcomputer 8 through an address bus 12 and a data bus 13. Chip selection signals $CE_1$, $CE_2$ and $CE_3$ are developed by the microcomputer 8 to select one of the ROM's 9 to 11. Words and/or sentences are applied to the microcomputer 8 from the selected ROM. $CE_4$ indicates a chip selection signal for the driver 6. "R/W"

indicates a read/write signal for selecting a read or write operation.

Figure 3:
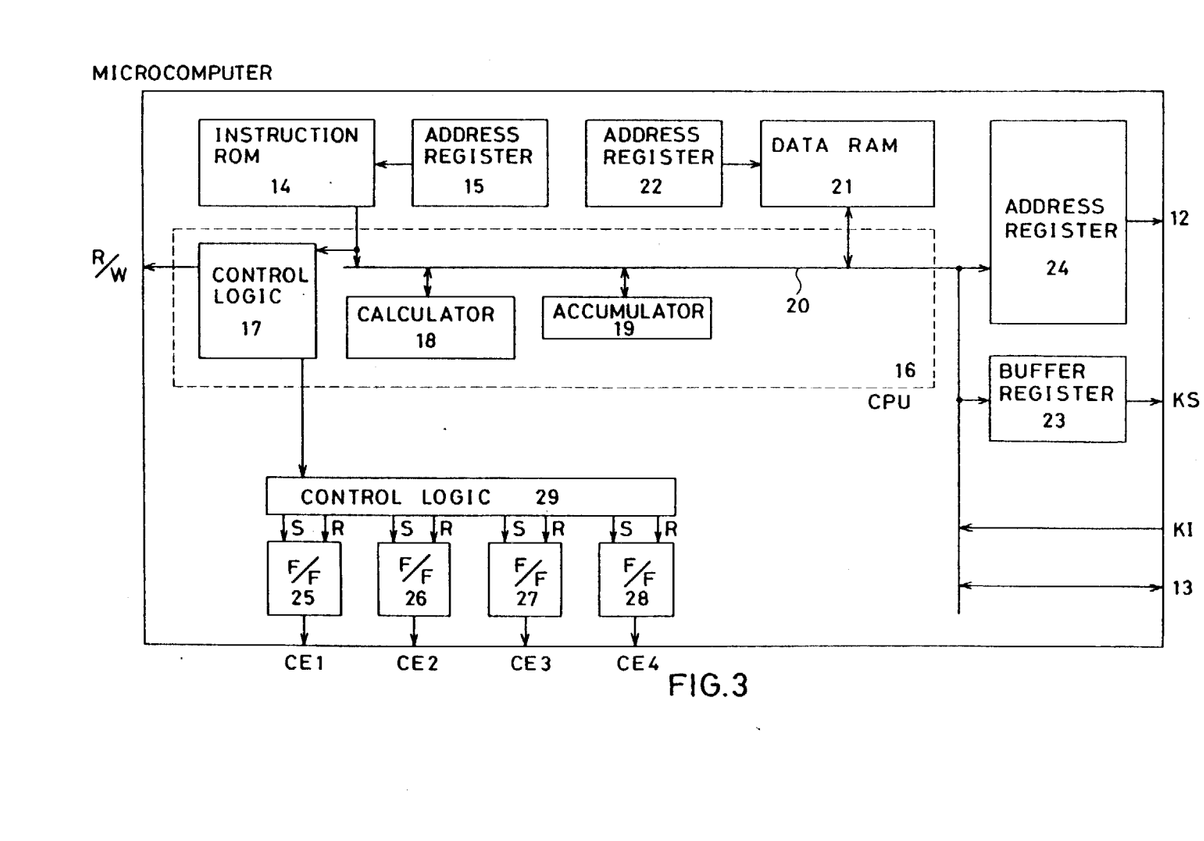

FIG. 3 shows a block diagram of the microcomputer 8 of FIG. 2. An instruction ROM 14 stores a number of kinds of instructions, each of which is used to perform a specific operation by the translator and is, preferably, in coded format. As the address of a ROM address register 15 is, in turn, advanced, the ROM 14 provides a specific instruction. The specific instruction is applied to a CPU 16 so that the CPU 16 understands its instruction to provide the selected operation.

The CPU 16 comprises a control logic 17, a logic calculator 18, and an accumulator 19. An internal data bus is indicated by the reference numeral 20. Data RAM 21 is provided for preliminarily containing data used for the translator and for functioning as a conditional flip-flop used for a branch in a program operation. Data from the CPU 16 is stored in a specific location within the data RAM 21 which location is selected by a RAM address register 22. The data stored in such a location within the RAM 21 is applied to the CPU 16.

Reference numeral 23 represents an output buffer register for outputting key strobe signals KS in turn to the key matrix circuit 7 so that the output of this circuit 7 is applied to the CPU 16 as key input signals KI. Reference numeral 24 indicates an address register for selecting the address of the external memory including the ROM's 9 to 11 and a RAM circuit within the driver 6. The output of the address register 24 is fed through the address bus 12. Control of the address register 24 to select increment or decrement and a certain address is carried out by the CPU 16. Since the CPU 16 is coupled to the data bus 13 as shown in FIG. 2, transmission of the data between the CPU 16 and the external memory is accomplished by use of the data bus 13. The direction of transmission of the data between them is defined with the read/write signal R/W.

Each of flip-flop circuits 25 to 28 is set or reset by a control logic 29. The control logic 29 is controlled by the CPU 16. The output of each of the flip-flops 25 to 28 is referred to as chip selection signals $CE_1$ to $CE_4$, respectively.

Figure 4:
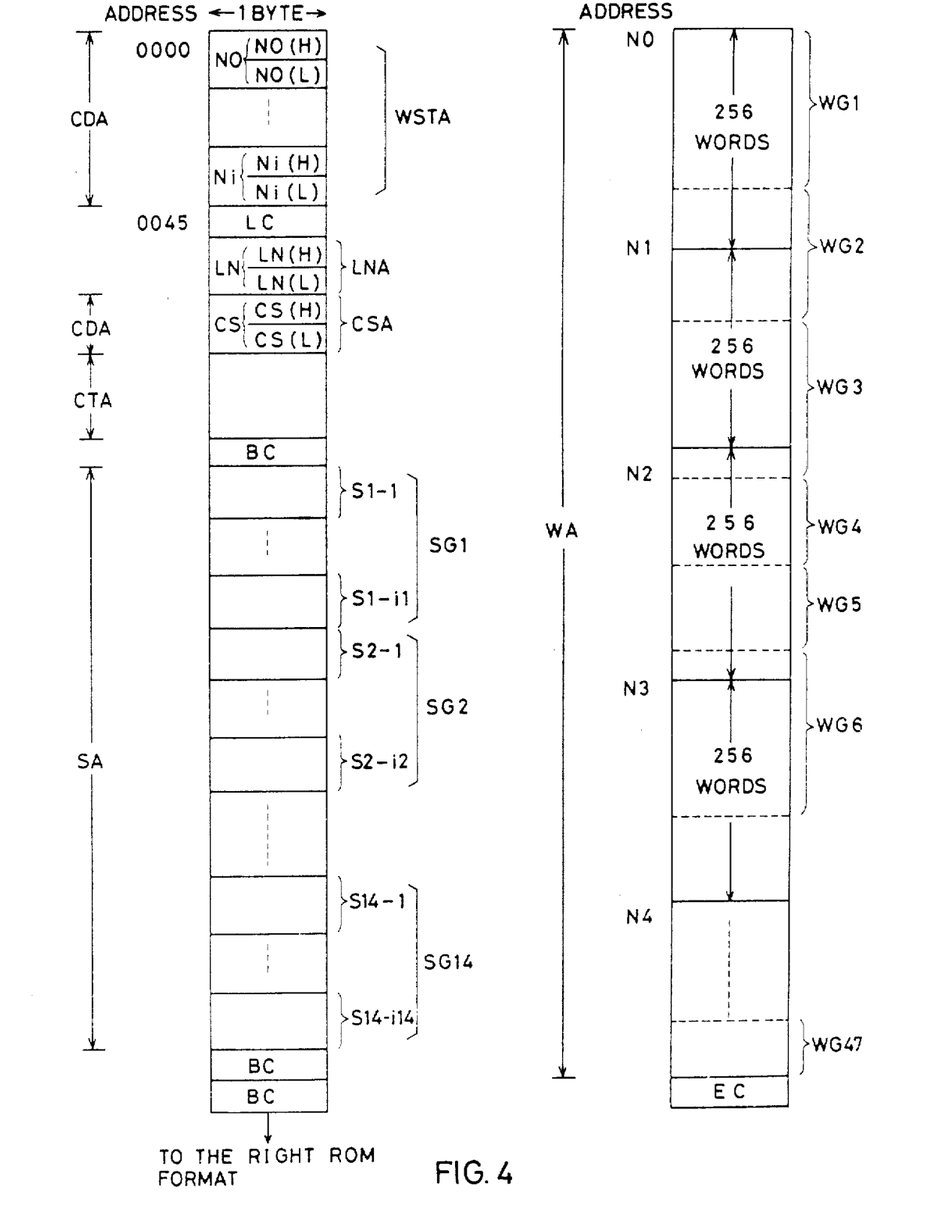
FIG. 4 shows a format of a ROM for storing words, the ROM being connected in the circuit of FIG. 2.

FIG. 4 shows a format in which a great number of words are stored in each of the ROM's 9 to 11. This format contains a control data region CDA, a data-compression table CTA, a sentence data region SA and a word data region WA.

Each of the words is stored in the ROM such that its spelling is compressed. For example, in the ROM I 9, a pair of letters "AN" is stored as a compressed code of 1 byte, $CC_1$. Another pair of letters "BA" is stored as a compressed code of 1 byte, $CC_2$. Frequency in occurrence of spelling of English words is determined to detect those spellings having high frequency in occurrence. The thus selected English spelling is changed to corresponding compression codes for data storage purposes. The data-compression table CTA stores data for ascertaining the correspondence between the selected spellings and the compression codes.

When correspondence between an input word and one or more words stored in one of the ROM's is to be detected, the input word is changed to codes, inclusive of one of the compression codes according to the contents of the data-compression table CTA since each of the ROM's stores codes which may include one of the compression codes. The table CTA is used to show words stored in one of the ROM's by changing the codes to the original spelling. This table is different depending on the language to make the degree of data compression the greatest.

Stored words are classified in 47 categories in each of which a number of words are ordered. In FIG. 4, a word category "n" is referred to as "WGn". Sentences are formed by a combination of a plurality of stored words. These sentences are classified in 14 categories, in each of which a number of sentences are ordered. In FIG. 4, a sentence category "m" is referred to as "SGm" containing a first sentence $S_{m-1}$ to a last sentence $S_{m-im}$. Each of the categories belonging to each of the word categories WG1 to WG14 corresponds to each of the sentence categories SG1 to SG14.

The following table shows the relationship between the serial number of the category and the name of the category.

TABLE 1-1

| The serial number of the category | corresponding key | the name of the category |
|---|---|---|
| 1 | "ra" or "Q" | airplane |
| 2 | "ri" or "I" | customs |
| 3 | "ru" or "A" | transporting machine |
| 4 | "re" or "J" | at hotel |
| 5 | "ro" or "S" | in restaurant |
| 6 | "m" or "T" | sight seeing |
| 7 | "mo" or "U" | amusement |
| 8 | "ho" or "V" | shopping |
| 9 | "no" or "W" | direction |
| 10 | "to" or "X" | business |
| 11 | "so" or "Y" | service |
| 12 | "ko" or "Z" | conversation |
| 13 | "O" or "." | at medical practitioner's Office |
| 14 | "SPC" or "o" | emergency |

Each category for the words may contain 256 words. A first word address table region WSTA contains a first address referred to as $N_0, N_1, N_2, \ldots N_i$ in FIG. 4. This first address is related to a location in which a first code or first compressed code for representing the first word is stored. In accordance with a specific example of the present invention, each address is represented by two bytes. Each first address is separated into an upper byte referred to No(H) to Ni(H) and a lower byte referred to No(L) to Ni(L). The first word address table region is used to shorten retrieval time for specific word.

CS is used to refer to a first sentence address CS(H) and CS(L) which is stored in a first sentence address region CSA. LNA indicates a memory location for storing a serial number of a word indicating the specific language as referenced by LN of LN(H) and LN(L). More particularly, as the ROM storing English words is concerned, a word "English" is necessarily contained in that ROM. In such a case, the serial number of the word "English" in the ROM is LN starting from the first word of the same kind of word group. Storing the serial number LN is suitable for showing the mother language and the foreign language being selected in the character indicator 3 because it is unnecessary to additionally store a word showing the language.

The translator of the present invention may comprise audible sound generating means for developing words represented in the mother language and/or the foreign language. Since such an audible sound generating means is disclosed in, for example, Hyatt, U.S. Pat. No. 4,060,848 issued Nov. 29, 1979, further description thereof is omitted.

In FIG. 4, LC indicates a language code in which the first four bits indicate a field of language stored in the ROM and the last four bits the kind of language stored in the ROM. In particular, there may be present a ROM for storing words oriented to economy, engineering or medicine, respectively. Information representing such a field is stored in LC. The last four bits corresponds to each language as follows:

TABLE 1-2

| The last four bits | the language |
| --- | --- |
| 0 0 0 1 (1) | English |
| 0 0 1 0 (2) | German |
| 0 0 1 1 (3) | Japanese |
| 0 1 0 0 (4) | French |
| 0 1 0 1 (5) | Spanish |
| 0 1 1 0 (6) | another language "o" |
| 0 1 1 1 (7) | a further language "▲" |

In FIG. 4, BC, "11111111" is a boundary code and EC "11111111" is an end code of the ROM.

A main feature of the electronic language translator according to the present invention is to selectively and automatically change additional words such as definite articles or prepositions to correspond to changed words to which the additional words are related. New sentences containing new words and the automatically changed additional words are formed from the stored sentences containing the unchanged words and the properly related additional words.

For this purpose, the electronic language translator comprises a memory means for storing discrimination codes each specifying the definite articles and prepositions that are contained within the stored sentences. Preferably, such a memory means is provided within the sentence data region SA of a ROM as shown in FIG. 4. As stated above, the sentence data region SA stores the definite articles and prepositions as part of the sentences. The translator further comprises another memory means for storing selection codes each specifying a word's gender or other additional types of word information and for storing words. Preferably, such a memory is provided within the word data region WA of the ROM as shown in FIG. 4.

Whenever some words in one of the stored sentences are replaced by new words, selection codes are selected for the new words so that discrimination codes are specified which agree with the selection codes. Therefore, definite articles and prepositions are specified and selectively outputted by the discrimination codes.

Turning back to FIG. 1, the electronic language translator further comprises an input key switch 1A, a translation key switch 1B, a search key switch 1C, some category key switches 5A, and a speaker SP. Beside the keyboard 1, each of these key switches, 1A, 1B, 1C and 5A, is operated as will be described below. The speaker SP is used to pronounce the word or sentence information in the case where the translator provides selectively an audible output of the word or the sentence information.

Figure 5:
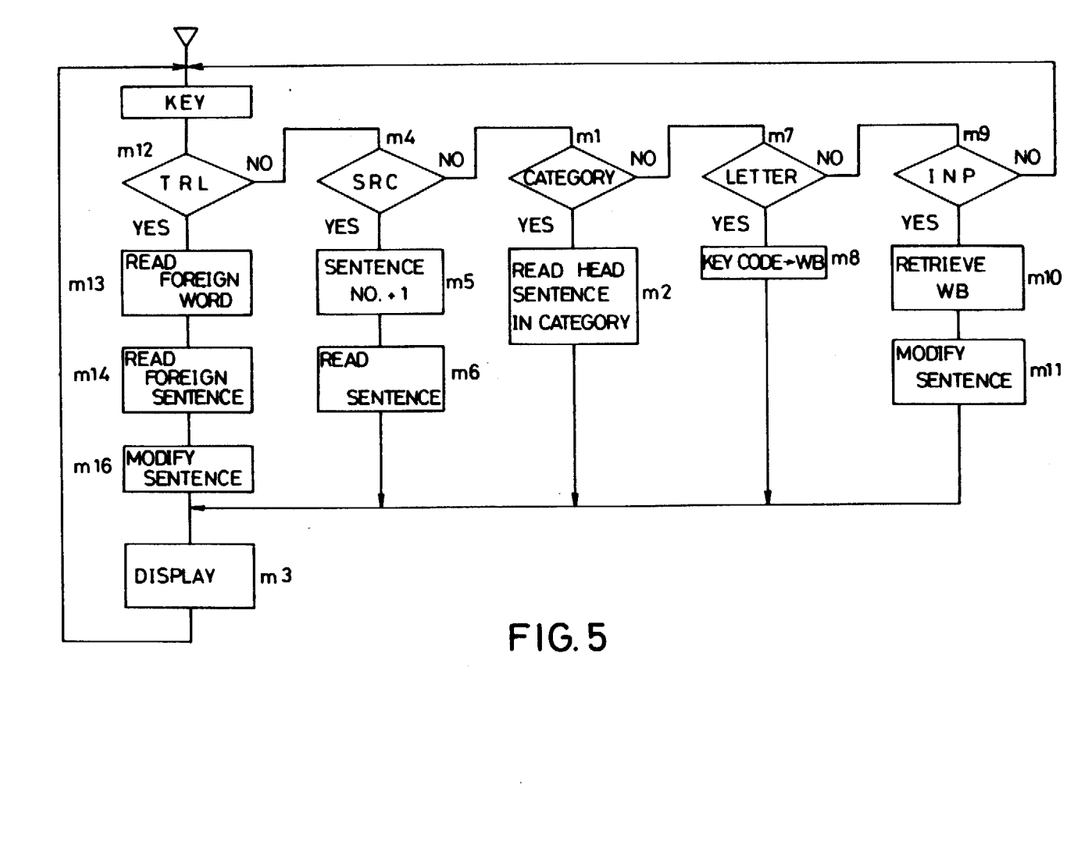
FIG. 5 shows a flow chart of the translator according to the present invention.
Figure 6:
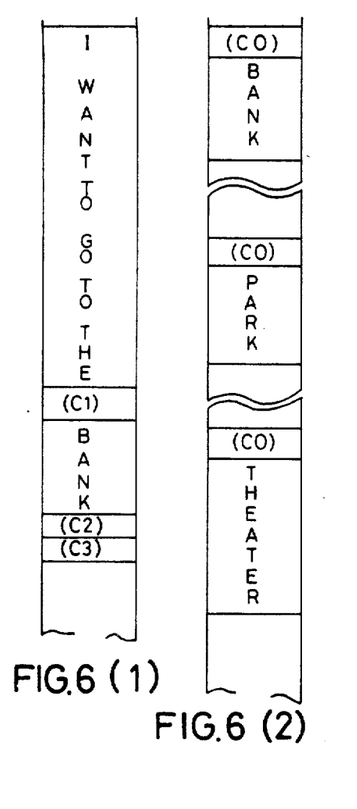

FIG. 5 shows a flow chart of the electronic language translator according to which each of the key switches identified is operated to enable respective operations.

In step $m_1$, one of the category key switches 5A is actuated to select one category of sentences. Step $m_2$ is executed to retrieve memory addresses corresponding to the category selected, so that the head sentence in the category is read out. This retrieval is carried out, as described above, by detecting the category separation code in the sentence data region SA and by detecting the sentence separation code in the region SA. Step $m_3$ is executed to display the head sentence selected.

When the head sentence is not the one desired, the search key switch 1C labeled "SRC" is actuated in step $m_4$ to select steps $m_5$ and $m_6$. Then, the second sentence of the category in the sentence data region SA is read-out and displayed. The search key switch 1C is actuated repeatedly until a desired sentence is retrieved and displayed.

It may be possible that the selected sentence has one or more changeable words in it that are enclosed within parentheses. When the one or more changeable words are replaced by one or more new words, the spellings of the one or more new words are inputted by actuating the letter key switches in the keyboard 1 in step $m_7$. Step $m_8$ is executed to transfer the spellings to a buffer WB. In step $m_9$, the input key switch 1A is actuated to select step $m_{10}$ in which any words having the identical spellings are retrieved from the word data region WA.

In step $m_{11}$, the sentence is modified by detecting the selection codes stored together with the one or more new words and by comparing the selection codes and the discrimination codes in the sentence. For example, it is assumed that German is selected as the mother language and the category of "Transportation" is selected. A sentence "ICH MÖCHTE AUF DIE (BANK) GEHEN." is then selected. It is desired to have a sentence equivalent to "I WANT TO GO TO THE (PARK)." The word of "bank" is changed to "park", so that a new sentence of "ICH MÖCHTE AUF DEN (PARK) GEHEN." is read-out and displayed.

It should be noted that the definite article "DIE" in the stored sentence must be changed to "DEN" since the word "PARK" is masculine.

In step $m_{12}$, the translation key switch 1B labeled "TRL" is actuated to translate the new sentence. When English is selected as the foreign language, a translation of "I WANT TO GO TO THE (PARK)." is obtained and displayed.

In step $m_{13}$, an English word is read out from the English word data region WA, the English word having the same serial number as the German "PARK" enclosed within the parentheses in the new German sentence. In step $m_{14}$, an English sentence is read-out from the English sentence data region SA, the English sentence having the same serial number as the German originally stored sentence. Step $m_{16}$ is executed so that the changeable word contained in the English sentence derived by step $m_{14}$ is replaced by the English word derived by step $m_{13}$, to provide a tentative English sentence. Further in step $m_{16}$, the definite article outside the parentheses in the tentative English sentence is automatically modified, if necessary.

FIGS. 6(1) and 6(3) show details of the sentence data region SA in FIG. 4. FIGS. 6(2) and 6(4) show details of the word data region WA. FIGS. 6(1) and 6(2) are related to an English word ROM and FIGS. 6(3) and 6(4) are related to a German word ROM. Code $C_1$ represents an opening parenthesis, code $C_2$ represents a closing parenthesis, and code $C_3$ represents an end of a sentence.

The format of FIG. 6(1) indicates the changeable word "bank" enclosed within parentheses. A sentence is read out from the sentence data region SA by reading in a code $C_3$. Discrimination codes are $C_0$, $C_a$, $C_b$, and $C_c$. These discrimination codes are added to or inserted into both the words and sentences. The word "bank" of FIG. 6(4) is preceded by the code Ca, the word "park" of FIG. 6(4) is preceded by the code Cc, and the word "THEATER" of FIG. 6(4) is preceded by the code Cb.

As FIG. 6(3) shows, the sentence is stored such that, if any syllable is changed according to the word contained in the parentheses, the syllable is separated from others and positioned at the head of the sentence. That is, the syllables of "AUF DIE", "AUFS" and "AUF DEN" are positioned at the head of the sentence of "ICH MÖCHTE [Ci] (BANK) GEHEN.". The code Ci indicates a position where to place one of the three syllables.

The discrimination codes Co, Ca, Cb, and Cc are also inserted between the syllables in the sentence. An accurate syllable is placed at the position specified by the code Ci by detecting the equivalency between one of the codes Co, Ca, Cb and Cc in the sentence data region SA and one of the same codes in the word data region WA.

A different code Ca' is added to the syllable "AUF DIE" in FIG. 6(3). This code Ca' is used to detect quickly what syllable must be placed at the position of Ci when the sentence of FIG. 6(3) is read-out in the mother language. With the help of the code Ca', the syllable "AUF DIE" is placed at the position of the code Ci, the syllable corresponding to the word of "BANK" of FIG. 6(3) as part of a complete sentence. For this purpose, the code Ca' is different from the code Ca. The difference between the codes Ca and Ca' is that the code Ca has "0" at the uppermost bit and the code Ca' has "1" at the uppermost bit. Then, the discrimination codes added to the respective words in the word data region WA are compared with the discrimination codes added to the sentence in the sentence data region SA in the lower bits except for the uppermost bit thereof.

Figure 7:
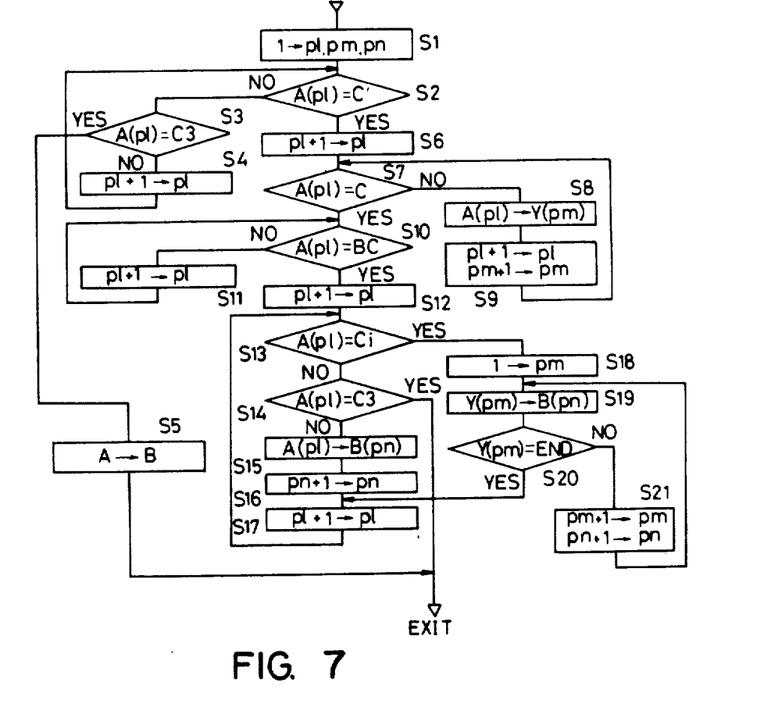
FIG. 7 shows a further flow chart of the translator according to the present invention.

As FIG. 6(1) shows, the definite articles and the prepositions, etc., if any, which are not changed in accordance with the word inserted between the parentheses, are stored such that none of the discrimination codes and the code Ci are contained within the body of the sentence. As FIG. 6(2) shows, the discrimination code Co is added to the respective words in the word data region WA. This code Co represents that these words do not cause any other words to be changed since they are not related to word gender. A code BC of FIG. 6(3) is used to separate the selectable syllables from the other sentence parts. FIG. 7 shows a flow chart for the translator of the present invention according to which the category key switches 5A or the search key switch 1C are operated to read-out a desired sentence from the sentence data region SA and to prepare a new sentence to be displayed.

Figure 8:
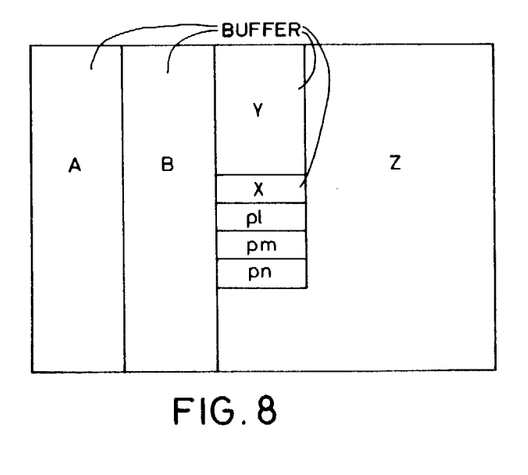
FIG. 8 shows a format of a RAM connected in the circuit of FIG. 2.

FIG. 8 shows a format of the data RAM 21 in FIG. 3. The data RAM 21 comprises four buffers A, B, X and Y, and three pointers Pl, Pm and Pn. The buffer A stores information read out from the memory, as it is. The buffer B stores sentence information prepared. The buffer X stores the discrimination codes. The buffer Y stores syllable information. The pointer Pl is for the buffer A. The Pointer Pm is for the buffer Y. The pointer Pn is for the buffer B. The data RAM portion Z is not used directly in the operation of the present invention.

With reference to FIG. 7, in step S1, "1" is added to the respective pointers Pl, Pm and Pn. Steps $S_2 \rightarrow S_3 \rightarrow S_4 \rightarrow S_2$ are executed to extract the discrimination codes from the buffer A. It is detected during changing the value of the pointer Pl whether the code specified by the pointer Pl and contained within the buffer A is any of the discrimination codes. If it is detected that none of the discrimination codes are present, steps $S_3 \rightarrow S_5$ are selected to transfer the contents of the buffer A to the buffer B without any change as in the case of the FIG. 6(1) format.

When a code C' is detected from the buffer A, the syllables from the code C' to the other discrimination codes or the code BC are transferred to the buffer Y. That is, steps $S_6 \rightarrow S_7 \rightarrow S_8 \rightarrow S_9 \rightarrow S_7$ are selected so that the information from the code C' in the buffer A is transferred to the buffer Y one character at a time. Steps $S_{10} \rightarrow S_{11} \rightarrow S_{10}$ are selected to advance the pointer Pl until the code BC is detected. A loop of steps $S_{12} \rightarrow S_{13} \rightarrow S_{14} \rightarrow S_{15} \rightarrow S_{16} \rightarrow S_{17} \rightarrow S_{13}$ is selected to transfer character information to the buffer B one character until the code Ci is detected.

When the code Ci is detected, a loop of steps $S_{18} \rightarrow S_{19} \rightarrow S_{20} \rightarrow S_{21} \rightarrow S_{19}$ is selected to transfer the contents of the buffer Y to the buffer B. After all of the information from the buffer Y is transferred, steps $S_{20} \rightarrow S_{17} \rightarrow S_{13} \rightarrow S_{14} \rightarrow S_{15} \rightarrow S_{16} \rightarrow S_{17}$ are selected to transfer the contents of the buffer A to the buffer B until the code $C_3$ is detected. Therefore, in the case of the FIG. 6(3) format, the buffer B stores the following sentence.

"ICH MÖCHTE AUF DIE [$C_1$] BANK [$C_2$] GEHEN [$C_3$]."

Then a display is:

"ICH MÖCHTE AUF DIE (BANK) GEHEN."

Figure 9:
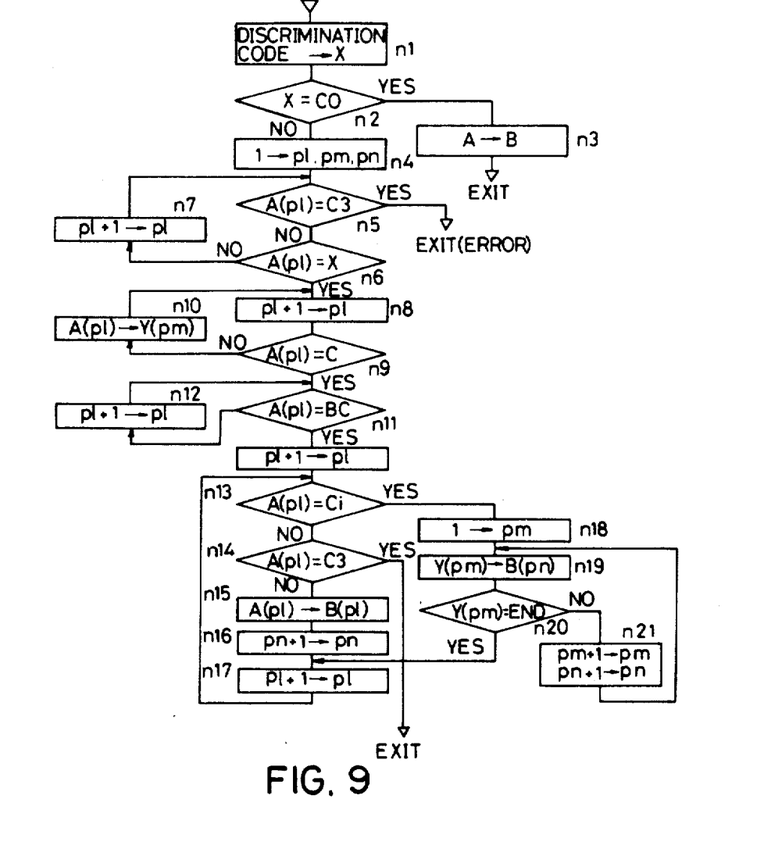
FIG. 9 shows a still further flow chart of the translator according to the present invention.

FIG. 9 shows a flow chart according to which the translation key 1B is operated to modify the sentences stored as shown in FIG. 5. In step $n_1$ of FIG. 9, some discrimination code is stored in the buffer X, the code being added to the word which is extracted from the word data region WA of the foreign language. Step $n_2$ is used to detect whether the discrimination code is the code $C_0$ or not.

When the code detected is the code $C_0$, step $n_3$ is executed to transfer the contents of the buffer A to the buffer B without any change, so as to display the contents. This is the case of the FIG. 6(2) format, where the buffer B receives and contains the contents of FIG. 6(1). When the code detected is not the code $C_0$, steps $n_2 \rightarrow n_4 \rightarrow n_5 \rightarrow n_6 \rightarrow n_7$ are selected to extract the same code as the code detected from the buffer A. When the same code as the code detected is not detected before the code $C_3$ showing the end of the sentence is detected, step $n_5$ is used to show an error operation since it proves that the word entered between the parentheses is not suitable for use in the sentence.

When the same code as the code detected is detected, steps $n_8 \rightarrow n_9 \rightarrow n_{10} \rightarrow n_8$ are selected to transfer the contents of the buffer A to the buffer Y, the contents of the buffer A transferred being from the initially stored code to the next control code. Steps $n_{11} \rightarrow n_{12}$ are selected to advance the pointer Pl until the code BC is detected. Steps $n_{13} \rightarrow n_{21}$ are executed in the same manner as in the steps $S_{12}$ to $S_{21}$ of FIG. 7, so that the contents of the buffer Y are inserted between the positions of the code Ci.

In place of the above-described sentence having a subject and predicate, syllables each composed of some words can be stored and used according to the teaching of the present invention.

The invention being thus described, it will be obvious that the same may be varied in many ways. Such variations are not to be regarded as a departure from the spirit and scope of the invention, and all such modifications are intended to be included within the scope of the following claims.

What is claimed is:

1. In an electronic language translator of the type in which a plurality of first sentences in a first language are stored in a first sentence memory area in a first language memory means, at least a portion of the first sentences having first selected words therein replaceable by first replacement words stored in a first word memory area in the first language memory means, the first replacement words being retrieved by an access means connected to the first language memory means to form first new sentences, the plurality of first sentences further having first related words that are grammatically associated with the first selected words and wherein a like plurality of equivalent translated second sentences having second selected words and second related words, and second replacement words in a second language are stored in a second sentence memory area and a second word memory area in the second language memory means respectively, from which a like plurality of translated second new sentences in the second language that are equivalent to the first new sentences in the first language, are accessed from the second language memory means, the second new sentences being retrieved and outputted by a second access means, wherein the improvement comprises:

the first and second language memory means each further storing coded information relating to the respective replacement words and a grammatical association between the related words and the respective replacement words in the first and second new sentences retrieved by the first and second access means from the respective language memory means, first means, responsive to the coded information in the first language memory means, for automatically changing the related words in a sentence when a first selected word is replaced by a first replacement word, the related words being changed in accordance with their grammatical association to the respective replacement words to produce a new sentence in which the grammatical association of the replacement words and the related words is correct in the first language, and second means, responsive to the coded information in the second language memory means, for automatically changing the related words in a sentence when a second selected word is replaced by a second replacement word, the related words being changed in accordance with their grammatical association to the respective replacement words to produce a new sentence in which the grammatical association of the replacement words and the related words is correct in the second language.

2. An electronic language translator according to claim 1, wherein the first replacement words for replacing the first selected words in the plurality of sentences are related to each other by first discrimination codes and the second replacement words are related to the second selected words by second discrimination codes.

3. An electronic language translator according to claim 2, wherein the first and second discrimination codes are stored in the respective first and second language memory means in association with both the respective ones of the plurality of sentences and the replacement words.

4. An electronic language translator according to claim 3, wherein the first and second discrimination codes distinguish between the selected word stored in a respective one of the plurality of sentences and the replacement words capable of replacing the selected word stored in the respective sentence.

5. An electronic language translator comprising:

first memory means for storing a plurality of first sentences in a first language, said first sentences each including at least one changeable word and at least one related word that is grammatically associated with said changeable word, said first memory means also storing first replacement words in said first language, said first memory means further storing a plurality of first distinction codes related to the at least one changeable word in said first sentences and first discrimination codes associated with the at least one related word, the first discrimination code and distinction codes being related to define the grammatical relationship between the at least one changeable word and the related word grammatically associated with the at least one changeable word;

second memory means for storing a plurality of second sentences corresponding to said first sentences, said second sentences each also comprising at least one second changeable word and at least one second related word that is grammatically associated with said second changeable word, said second memory also storing second replacement words corresponding to respective first replacement words, said second memory means further storing a plurality of second distinction codes related to the at least one second changeable word in the plurality of second sentences and second discrimination codes associated with the at least one second related word, the second discrimination code and distinction codes being related to define the grammatical relationship between the at least one second changeable word and the at least one second related word associated with the changeable words;

selection means for selecting one of said plurality of first sentences to be translated and for changing said changeable word to a selected one of said first replacement words;

means responsive to said input means for retrieving from said second memory a second sentence and a second replacement word corresponding to said input first sentence including said input first replacement word; and additional means, responsive to the first discrimination and distinction codes, for altering the form of said at least one related word in said selected one of said plurality of first sentences in order to maintain a proper grammatical relationship between the selected one of said first replacement words and the at least one related word, said additional means, also responsive to said second discrimination and distinction codes, for altering the form of the at least one second related word in said retrieved second sentence in order to maintain a proper grammatical relationship between said at least one second related word and said second replacement word.

* * * * *